United States Patent [19]
Larche et al.

[11] Patent Number: 5,765,144
[45] Date of Patent: Jun. 9, 1998

[54] SYSTEM FOR SELECTING LIABILITY PRODUCTS AND PREPARING APPLICATIONS THEREFOR

[75] Inventors: Kimberly Larche, Middleburg, Fla.; Clemens Taeuber, Ridgefield, Conn.

[73] Assignee: Merrill Lynch & Co., Inc., New York, N.Y.

[21] Appl. No.: 669,080

[22] Filed: Jun. 24, 1996

[51] Int. Cl.$^6$ .................................................. G06F 17/60
[52] U.S. Cl. ............................................................ 705/38
[58] Field of Search ................................. 395/235, 236, 395/237, 238, 239; 705/35, 36, 37, 38, 39

[56] References Cited

U.S. PATENT DOCUMENTS

| | | |
|---|---|---|
| 4,346,442 | 8/1982 | Musmanno . |
| 4,376,978 | 3/1983 | Musmanno . |
| 4,597,046 | 6/1986 | Musmanno et al. . |
| 4,674,044 | 6/1987 | Kalmus et al. . |
| 4,700,297 | 10/1987 | Hagel, Sr. et al. . |
| 4,774,663 | 9/1988 | Musmanno et al. . |
| 5,270,922 | 12/1993 | Higgins . |
| 5,297,032 | 3/1994 | Trojan et al. . |

OTHER PUBLICATIONS

Anonymous, MortgageWare Resource Guide, INTERLINK Software Corp. Chapt. MAI, QUA and CRG., Nov. 1992.
Anonymous, A Man with Grand Visions, Banking Technology, pp. 30–32, May 1993.
Emily Thornton, Going Belly–up In Japan, Business Week, May 5, 1997.

*Primary Examiner*—Gail O. Hayes
*Assistant Examiner*—Junghoon Kenneth Oh
*Attorney, Agent, or Firm*—Hopgood, Calimafde, Kalil & Judlowe LLP

[57] ABSTRACT

A system is disclosed having a graphical interface for interactively interviewing and educating a customer regarding their credit needs and the available products. The system also inquires, for example, about the customer's opinion regarding the future of interest rates or the importance to the customer of steady monthly payments. Using the information gained and unique selection processes, the system determines which of the available credit products will result in the lowest average monthly payment or lowest average interest rate over the expected holding period of the product. The selection is based on updated interest rate and product information. Once the customer selects a recommended product, the system generates an electronic credit application, requiring only information germane to that customer's transaction. The system also automatically completes as much information as possible on the application. Once the customer finishes the minimal information remaining, the system generates a completed application to be submitted to the financial institution for processing and approval in any of a number of formats. If the customer already has asset or liability accounts with the particular financial institution offering the credit products, the customer's information is also automatically retrieved and incorporated into the selection and application generation processes.

7 Claims, 14 Drawing Sheets

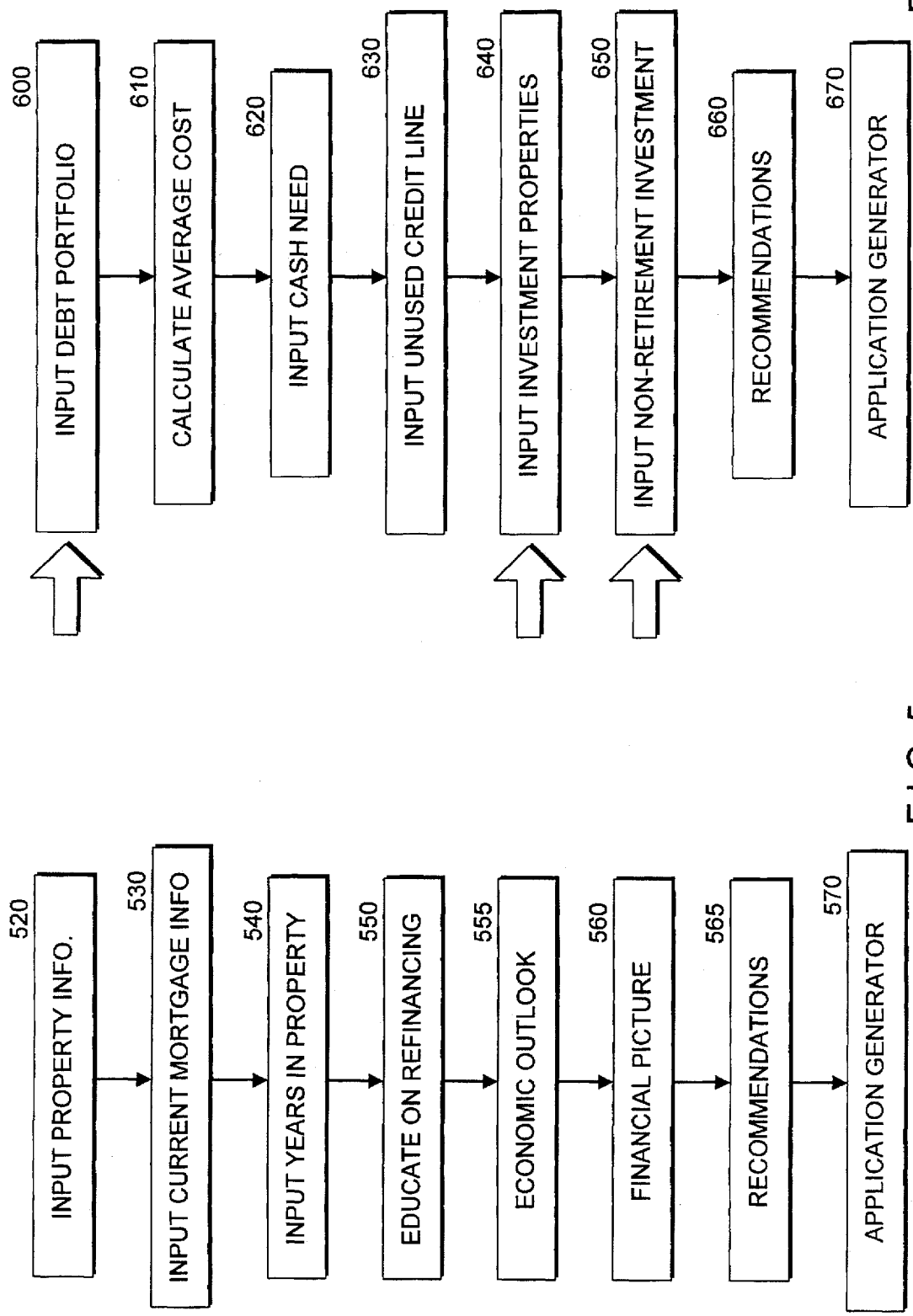

Recommendations

1 Year Adjustable - the product that best meets your needs

PrimeFirst - a great product for you

3/1 ARM - another great product for you

We recommend the products listed to the left based on the information you provided us.

In order to understand more about each recommendation, click the button next to the product of interest.

You may change any of your answers by clicking the button corresponding to the profile section [at the bottom of the page].

We have many other products that you can research by going back to the main menu.

<< Back

RECOMMENDATION
FINANCIAL PICTURE
ECONOMIC OUTLOOK
DOWN PAYMENT
BEST USE OF FUNDS
THE PROPERTY

1 Year Adjustable
PrimeFirst
3/1 ARM

Product Information

1020

Why PrimeFirst is a great product for you

1. Your perception of interest rates is the most important factor we used to determine that the PrimeFirst effectively manages your liabilities.

2. Since you expect to own the property 15 years, we applied your perception of interest rates [shown to the left] to each of our products in order to find the product with the lowest average payment over the holding period.

3. The PrimeFirst effectively manages your cash flow over the 15 years you plan to own the property. Your average payment over the holding period would be: $1,283.53

4. PrimeFirst is an interest only product, which allows you flexibility to determine the best use of the principal dollars.

5. Low Down Payment Option(s):

1030 — Calculators
1040 — Complete an Application
1050 —

See how Janice maximized her net worth using the PrimeFirst Self Directed mortgage << Back 1010 — More about PrimeFirst Statistics Today's Rate Holding Period   0 to 15 Years THE PROPERTY | BEST USE OF FUNDS | DOWN PAYMENT | ECONOMIC OUTLOOK | -$ +$ FINANCIAL PICTURE | RECOMMENDATION

Application Builder

Select the items from each category that apply to your situation by clicking on the item and dragging it into the Application container or double clicking the item

- John
- Co-Applicant

/ Purpose \
- Purchase Property
- Refinance
- Home Improvement
- Line of Credit
- Qualified Buyer/No Property Yet
- No Property Involved
- Other Purpose

/ Income \
- Self Employed
- Own Interest in a Business
- Receive Alimony/Child Support
- Other Income

/ Assets \
- Assets held outside
- Real Estate

/ Obligations \
- Installment Loans [ cars, boats ]
- Mortgage Payment
- Rent Payment
- Pay Alimony/ Child Support << Remove

John's Application
- Salaried/Commission/Bonus
- Client
- Credit Cards 1110
1110
1110
1110
1120

<< Back        Next >>

Calculator

Choose a Mortgage

Categories
- [ ] Fixed Rate Mortgages
- [x] Adjustable Rate Mortgages
- [ ] Fixed/Adjustable Rate Mortgages
- [ ] PrimeFirst Mortgages
- [ ] Home Equity Mortgages
- [ ] Omega Mortgages Adjustable Rate Mortgages
- [x] 1 Year Adjustable Mortgages Available
- [ ] Maximum Loan Amount of $180,000 at a base rate of 5.875%

Back    MORTGAGE INFORMATION    PROPERTY INFORMATION    << Back

To compute an am... leave that fie...
Term:
Loan Amount:
Rate:
Monthly Payment:

I need to reduce my closing costs

BASE INFORMATION

SYSTEM FOR SELECTING LIABILITY PRODUCTS AND PREPARING APPLICATIONS THEREFOR

FIELD OF THE INVENTION

This invention relates generally to systems for processing financial information and customer profile data. More specifically, the present invention relates to a system for processing customer data to assist in the selection of credit programs and to assist in the creation of an appropriate credit application.

BACKGROUND OF THE INVENTION

The credit industry is highly competitive, with many different credit sources offering a multitude of credit packages tailored to meet almost any conceivable financial situation and need. Even within one financial institution, there may be a wide variety of credit products, varying in their interest structures, qualifying requirements and governing rules. Each credit product might also be affected by the various states' statutes and regulations, so that one particular product might appear different to a customer in one state compared to a customer in another.

Matching a customer with an appropriate credit product would be a difficult task if left to the customer alone. Thus, in the past, financial institutions have used their own personnel to assist customers. There are basic customer service representatives (CSRs) or loan officers, who are capable of answering simple, technical questions, such as those relating to filling out forms. One financial institution further utilizes financial consultants (FCs) who assist customers by discussing the customer's overall financial position and credit needs and then selecting and recommending products that seem to fit with that particular customer's situation. Sometimes, these recommendations are based on one or two simple calculations, perhaps based on assets and needs. FCs also may inject their own personal opinions, even when they may not be the most appropriate. Otherwise, the selection of products would often be based on the subjective and often uninformed opinions of the customer.

Unfortunately, FCs have historically been highly trained to assist customers with their asset management, but are only recently addressing liability and credit issues. The resulting variability in FC recommendations due to individual subjectivity may therefore also lead to erroneous decisions by customers. These decisions can obviously have a significant effect on the customer, since an improper credit product translates into a lower overall net worth for the customer. To date, the only attempts to decrease the variability of FCs recommendations have involved personnel education, which still leaves the individual FC's subjectivity as a significant factor in customer recommendations.

Beyond the issue of what recommendations are given, after the selection of a credit product has been made and agreed upon by the customer, a lengthy application process lies ahead for the customer, beginning with a blank set of application papers sent to the customer by the FC or CSR. Because of the increasingly cautious nature of underwriting credit, these applications are overwhelming to customers who need to fill in page after page of exacting financial and personal information. Also, these applications tend to be universal, including much information that does not apply to a particular customer's transaction, lengthening the application completion process. In fact, this step is often the crux of closing a transaction relating to credit, in that many of these applications go uncompleted by the applicant. This not only leads to the financial institution's loss of the interest income on that customer's credit, but also a waste of valuable manpower, measured by the FC's time, and administrative resources, measured by the recordkeeping burden for the FC's and the costs associated with producing and forwarding applications.

In an attempt to increase the closure rate among credit applications sent to customers, some financial institutions have begun to simplify the application preparation process. FCs not only have the capability of assisting with the selection of an appropriate credit product, but also now assist with completing the application itself. Using the customer profile data obtained from the customer, either over the phone, fax or in person, along with information relating to the specific credit product selected, the FC would prepare an application form with as much information as possible already completed. When the customer receives the application, his/her overall burden will be reduced, as there will be fewer "blanks" on the application form. With less to do, the applicant is more likely to complete the application and forward it back to the financial institution for processing and, perhaps, approval.

However, even with this added assistance from the FCs, the customer's overall paper and records preparation process is a multi-step, fairly burdensome procedure. For customers who need the credit, the burden is a necessary evil, although one financial institution with an easier process might attract customers from an institution with a more onerous process. For customers who do not have an immediate need for the credit, but can nevertheless benefit from consolidating their credit or moving to another product, the burden might dissuade them, denying them those benefits and denying the financial institution the benefits of interest income, closing costs, and/or origination fees.

SUMMARY OF THE INVENTION

In view of the deficiencies of the prior art, it is an object of the present invention to provide a system for assisting a sales force and customers in objectively selecting liability/credit products by using techniques termed "Liability Management$^{SM}$" to maximize net worth and also for automatically generating credit applications.

It is another object of the present invention to provide a system that gathers various information from a customer on which to base the selection of credit products for that customer.

It is a further object of the present invention to provide a system that selects credit products based in part on the customer's personal opinion as to the future of interest rates.

It is yet another object of the present invention to provide a system that includes a graphical, interactive interface for use by a customer in entering information and selecting credit products.

It is a still further object of the present invention to provide a system that automatically uses information gathered during the credit product selection process to automatically complete portions of a credit application and that automatically generates a completed application.

It is still another object of the present invention to provide a system that has access to updated information relating to the various credit products available to the customer.

It is a yet further object of the present invention to provide a system that has access to any available information concerning the customer and automatically uses the information both in the product selection process and the application generation process.

In accordance with the objects of the invention, a system is provided having a graphical interface for interactively interviewing and educating a customer regarding their credit needs and the available products. The system also inquires, for example, about the customer's opinion regarding the future of interest rates or the importance to the customer of steady monthly payments. Using the information gained and unique selection processes, the system determines which of the available credit products will result in the lowest average monthly payment or lowest average interest rate over the expected holding period of the product. The selection is based on updated interest rate and product information. Once the customer selects a recommended product, the system generates an electronic credit application, requiring only information germane to that customer's transaction. The system also automatically completes as much information as possible on the application. Once the customer finishes the minimal information remaining, the system generates a completed application to be submitted to the financial institution for processing and approval in any of a number of formats. If the customer already has asset or liability accounts with the particular financial institution offering the credit products, the customer's information is also automatically retrieved and incorporated into the selection and application generation processes.

BRIEF DESCRIPTION OF THE DRAWINGS

The foregoing and other objects and advantages of the present invention will become apparent to those skilled in the art upon reading the following detailed description of the preferred embodiment in conjunction with a review of the appended drawings, in which:

FIG. 5 is a logic flowchart of a refinancing submodule of the system of the present invention;

FIG. 6 is a logic flowchart of a personal credit submodule of the system of the present invention;

FIG. 9 is a Recommendations screen of the system of the present invention;

FIG. 10 is a Product Information screen of the system of the present invention;

FIG. 11 is an Application Builder screen of the system of the present invention;

FIG. 14 is a Calculator screen of the system of the present invention.

DETAILED DESCRIPTION OF THE PREFERRED EMBODIMENTS

Figure 1:
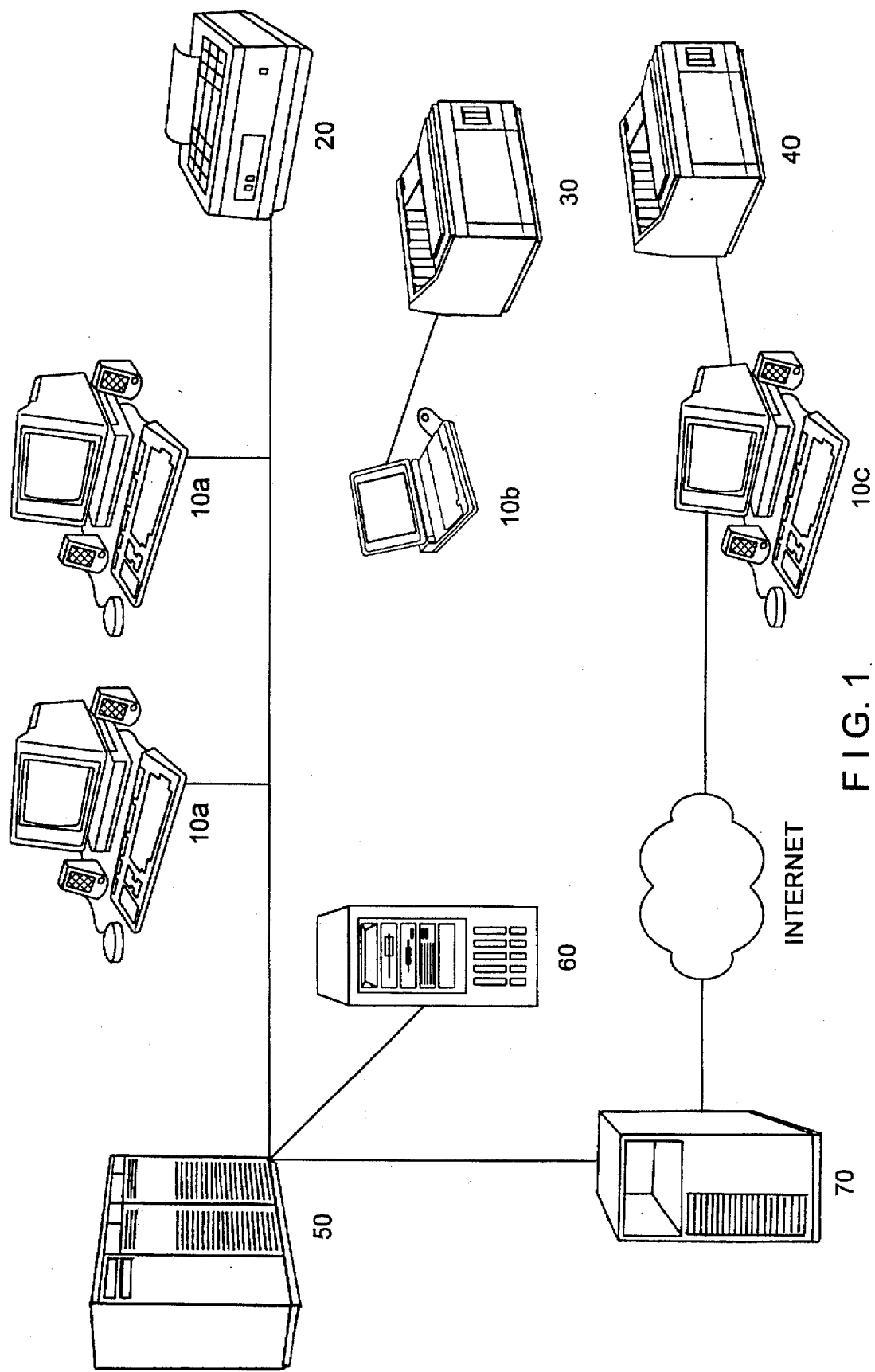
FIG. 1 is a schematic hardware diagram of a system according to the present invention.

Referring now to FIG. 1, the hardware of a system according to a preferred embodiment of the present invention is shown. Three different operational structures are shown in the figure, although many are contemplated. All three require the main component of the system, which is a personal computer or other workstation 10a,10b,10c, on which the system software is accessed by a customer or FC. In general, the operation of the system is identical for the three workstations, although each has a different means of accessing the financial institution supporting the system. Preferably, each workstation has at least a 486-type processor with a VGA display and multimedia capabilities, although the exact configuration is not critical. The Windows operating system is preferred, although any graphical user interface may be used similarly.

Since several of the submodules of the present system may access databases not resident on the workstations 10, as will be discussed further below, each workstation 10 has a network connection to the financial institution offering the products stored in the system. In the case of workstation 10a, this connection is preferably a constant connection over a local or wide area network (LAN/WAN) to a server 50. In this configuration, the workstation 10a would be used by a CSR or FC within the financial institution. Workstation 10b is preferably a mobile, laptop-type computer and is preferably connected to the server 50 through a standard modem connection over the public telephone network, but it is also contemplated as an ISDN, X.25 or any other data transfer protocol network. This telephone network connection to the financial institution first passes through a firewall system 60 for security purposes, as is known in the art. Workstation 10b would most likely be used by an FC at a remote site, perhaps a customer's residence. Workstation 10c is preferably connected to the financial institution over a global network, such as the present Internet. In this situation, the workstation 10c would only include standard internet access software, such as a World Wide Web browser, while the system software would be maintained on an internet server 70, within the financial institution, downloading information to the workstation 10c as needed. Such a setup could be used directly by a customer at his/her residence or business. The internet server 70 would then be connected to the main system server 50.

Once the workstation 10 is connected, through whatever means, data as needed may be retrieved from the financial institution servers 50 containing the databases described below. For example, the server 50 preferably includes a database containing interest rate information and customer profile data. It is also contemplated that the server 50 could contain any updates to the software resident on the workstations 10abc, downloading it to the workstations 10abc as necessary.

Each workstation 10a, 10b, 10c is then also preferably connected to a printer (20, 30, 40, respectively) such as a standard laser printer, for outputting a completed credit application generated by the system resident on the workstation 10abc (or through the internet). Although it is not in any way critical to the system, the system implementation on workstations 10a and 10b are preferably accomplished using the Visual Basic, C++, MS Access and SQL server programming environments.

Figure 2:
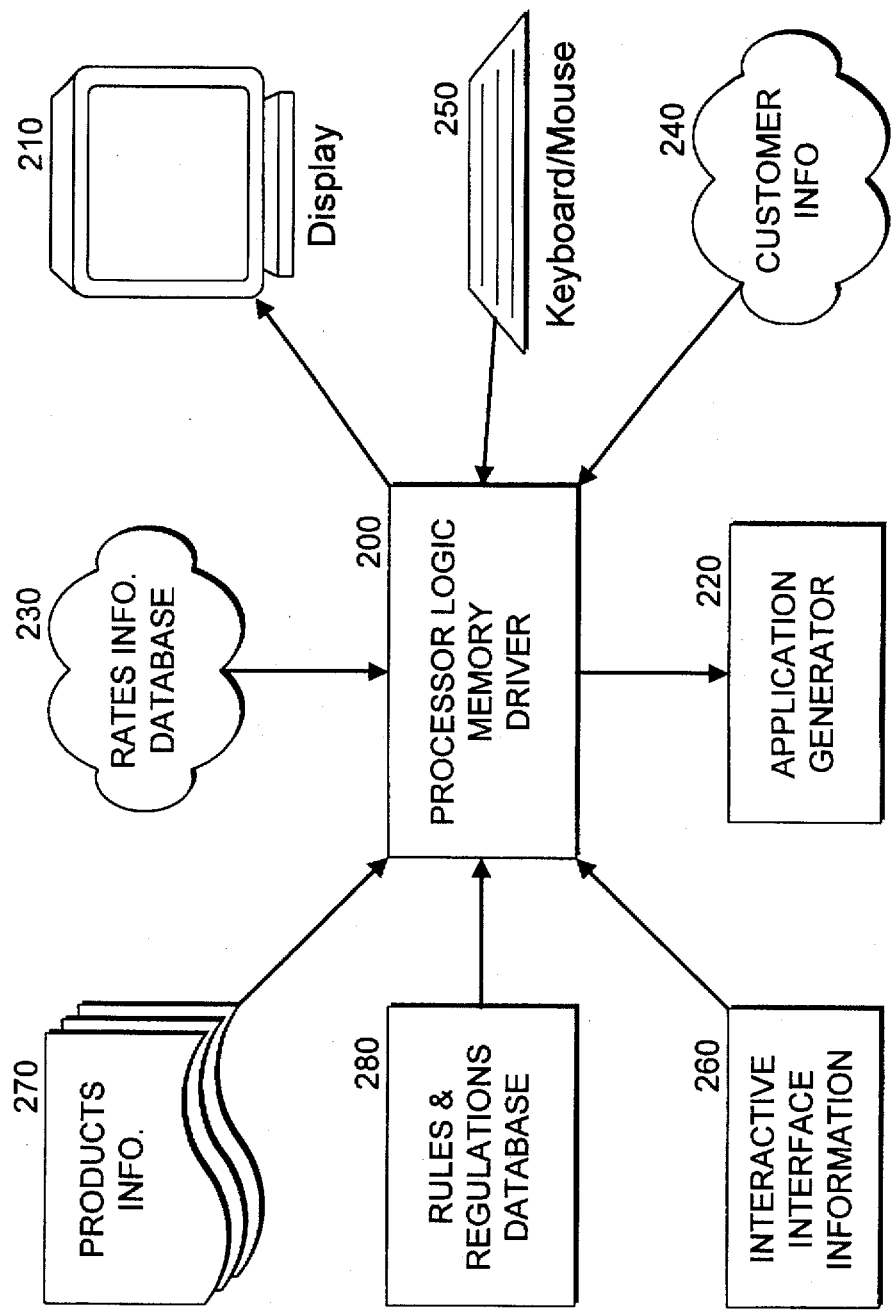
FIG. 2 is a schematic software diagram showing the overall organization of various software components of the present invention.

Referring now to FIG. 2, the overall system component organization is shown schematically. The central processor 200 receives input from various sources, including the customer, and generates outputs to the display 210, mortgage/credit application generator 220, and alternatively, as discussed below, to the financial institution. The processor includes the various drivers and operating system routines necessary to operate the system, such as generating the multimedia interface and communicating with the financial institution. The processor 200 receives data from potentially two database sources within the financial institution; namely, a database 230 containing updated product interest rate and parameter information, and a database 240 containing customer data if the customer using the system already has accounts with the financial institution.

The processor 200 also receives input from the customer through a keyboard and mouse 250, in response to the interactive interface 260, which is displayed as appropriate. For selecting its recommended credit products, the processor 200 accesses static information (non-volatile parameters) about the products, which is stored in an internal database 270 as part of the present system and is preferably resident on the workstation. The processor also accesses a database 280 of state-specific rules and regulations that apply depending on the property's state. Since this database 280 is also generally non-volatile, it is preferably stored on the workstation 10. Both databases 270, 280 may be updated as necessary, such as by access to a financial institution server 50.

The interactive interface includes video clips of a "guide" to help the customer navigate through the interview process by which the processor obtains information necessary to recommend products. Throughout the interview and selection processes, the customer is presented with screen buttons, input fields and charts to easily enter information or respond to the system inquiries. As an example of the ease of using the system, the customer is often presented with a choice of "I don't know" in response to specific questions. Upon selecting "I don't know," the interactive interface presents the customer with worksheets or other assistive information to allow the customer or the system to accurately estimate the answer. For further background information, a Bookshelf submodule is included in the system, which provides descriptive material on the available products from the financial institution.

If the FC or customer is unsure which of the submodules described below would be most helpful to the customer, a brief interview may be conducted by the system, gathering basic financial data on the customer's properties, assets and debts. Once gathered, calculations are performed to determine if any of the financial institution's products would improve the customer's overall portfolio. If so, the appropriate submodule described below is initiated.

Home Purchase Submodule

Figure 3:
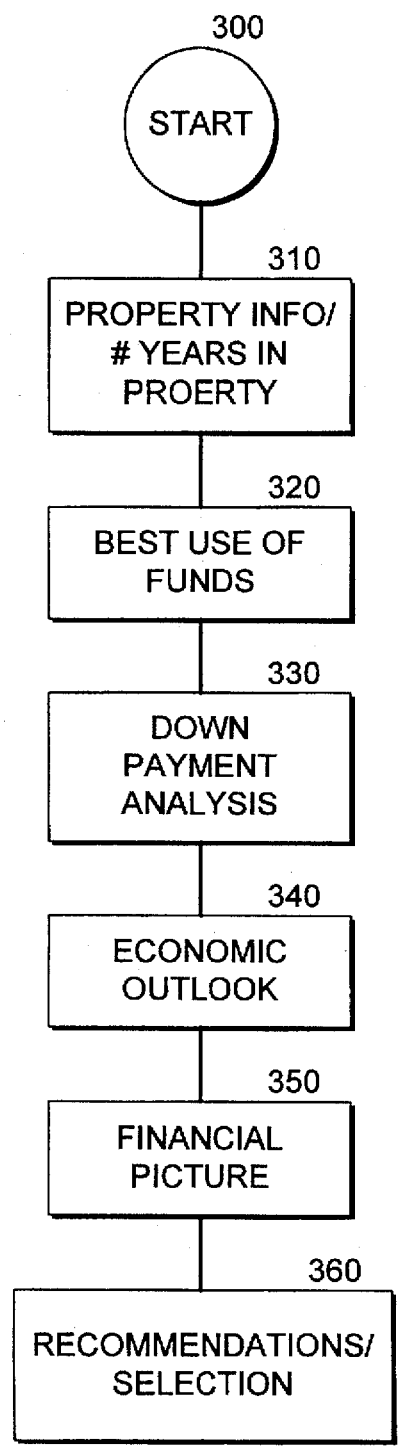
FIG. 3 is a high-level logic flowchart of a home purchase submodule of the system of the present invention.

Referring now to FIG. 3, a high-level flowchart showing the logic of the Home Purchase submodule of the present invention is shown. This particular submodule concerns the purchase of a home and selecting an appropriate mortgage product for that purchase. To arrive at product recommendations and ultimately generate a credit application for a particular product, the submodule performs five major steps: (1) The Property/Years in Property 310; (2) Best Use of Funds 320; (3) Down Payment 330; (4) Economic Outlook 340; and (5) Financial Picture 350. Once those steps have been performed, the system calculates and then displays its recommendations 360, allowing the customer to review each recommended product's features, make a selection and ultimately generate an application. Other submodules, described below, for Refinancing and Personal Credit, have some steps in common with the Home Purchase submodule, as will be seen. Thus, the Home Purchase submodule will be discussed in the greatest detail, while the description of the other submodules will refer back to portions of the Home Purchase submodule. The calculations used in making recommendations, described more fully below, focus on whether a particular product is available to a customer and if the customer is eligible for that product. Each step of the process will be described in more detail, as follows.

Figure 4A:
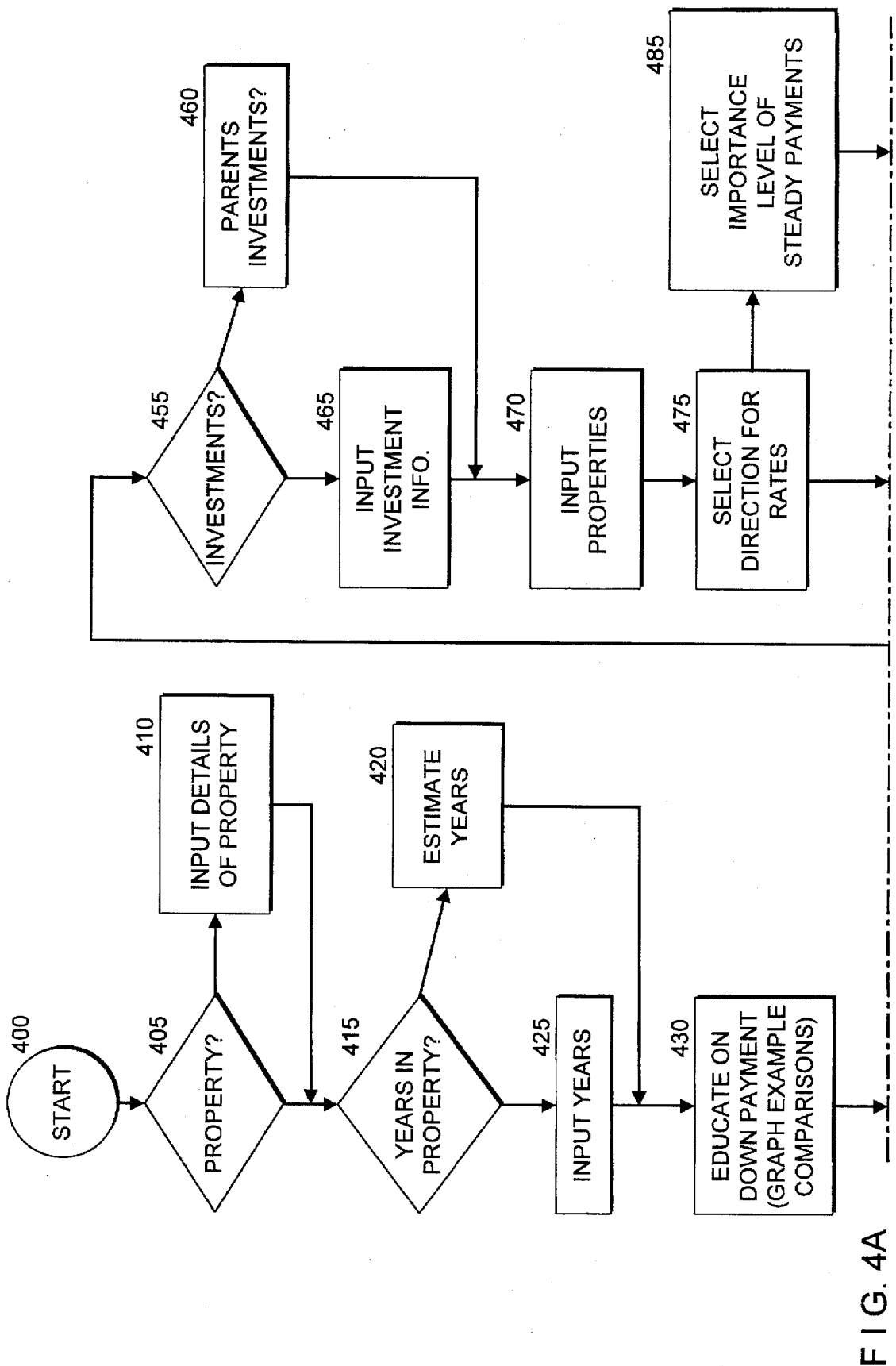
FIG. 4 is a lower level logic flowchart of the home purchase submodule of the system shown in FIG. 3.
Figure 4B:
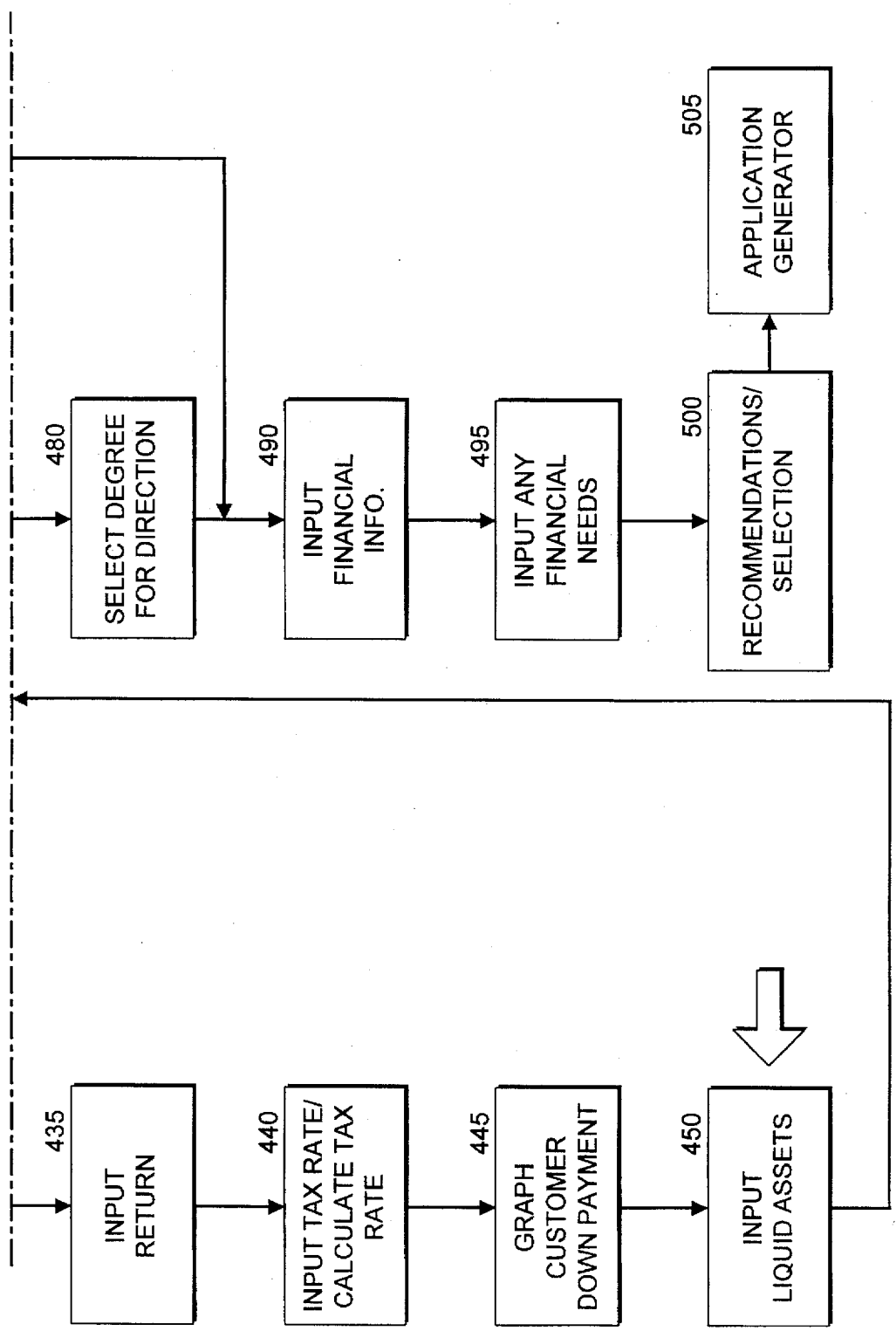

Referring now to FIG. 4, the Home Purchase submodule is shown in greater detail than in FIG. 3. When the system is initiated by the customer or FC, the processor 200 accesses the interactive interface information 260 and displays the video guide, who presents the submodules available to the customer. Once the customer has selected the Home Purchase submodule, the processor initiates the interview/selection process (at block 400, FIG. 4). The system first inquires as to whether the property to be purchased has been selected 405. If not, the system will later in the process suggest how large of a mortgage the customer can qualify for. If property has been chosen, the customer must input the details of the property 410, such as the price, the property state/county, the property type and whether the property is a first or second residence or investment property. The system next inquires how long the customer intends to stay in the property 415. If known by the customer, he/she inputs the number of years 425. If not known by the customer, the system asks further questions and then estimates the number of years based on national averages 420. For example, someone who answers that they intend to move frequently will be estimated to stay three years, while if it is the customer's final home, the estimate jumps to 30 years. Once determined, this figure is stored in memory as the holding period, which is referred to below. Logic blocks 405–425 are represented by block 310 in FIG. 3.

Figure 7:
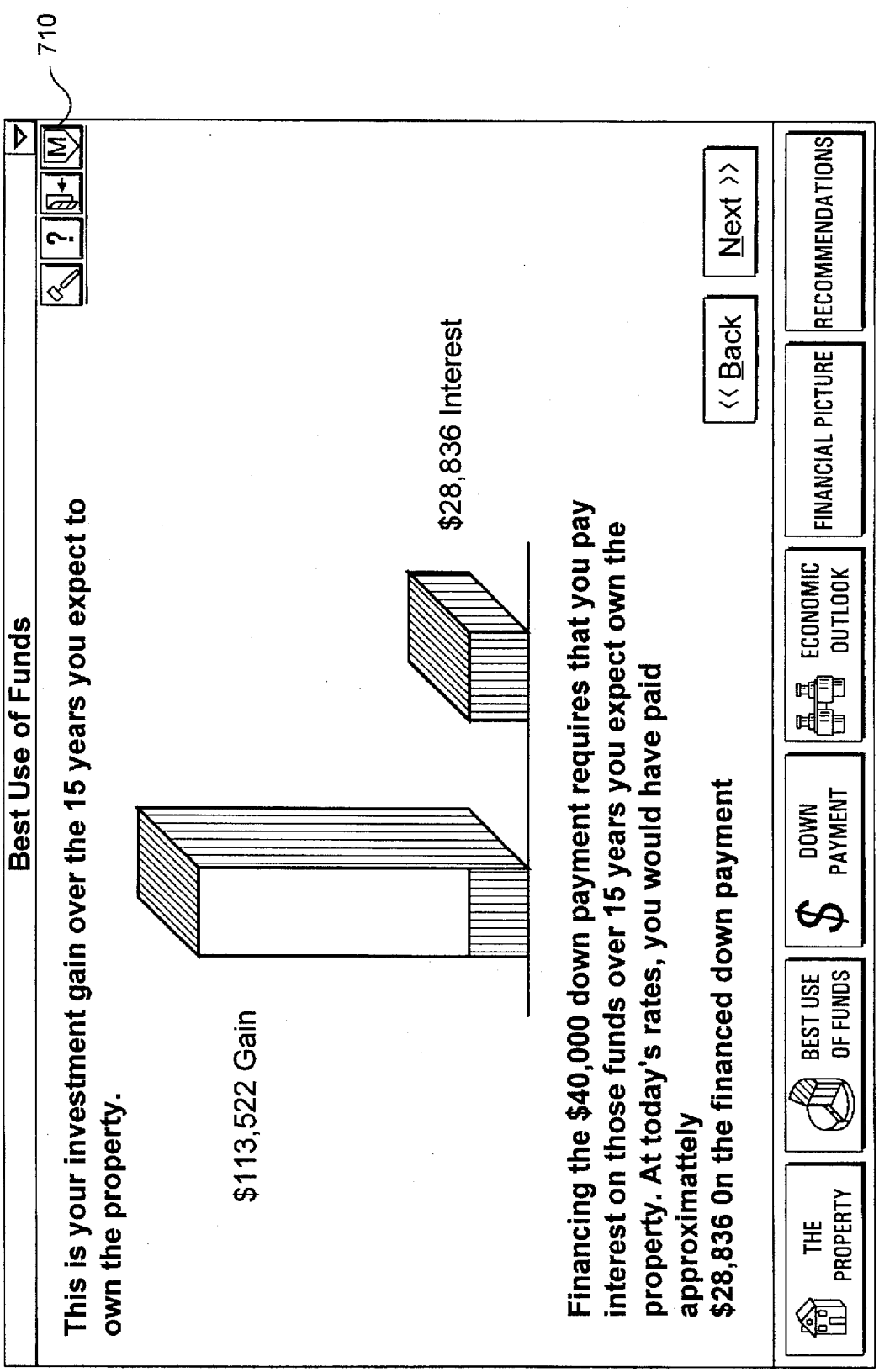
FIG. 7 is a Best Use of Funds screen of the system of the present invention.

As part of the interactive nature of the system, and consistent with the overall strategy termed Liability Management$^{SM}$, the system also educates the customer concerning the best use of his/her available down payment money, i.e., whether the money should be invested separately or put into the downpayment for the mortgage 430. The system calculates the return on investments relative to the holding period made instead of a down payment and then displays comparisons for different rates of return, preferably 5, 10 and 15 percent. This allows the customer to recognize in plain, visual terms, that with a high enough rate of return, investing a down payment may be a wiser investment, even though the amount financed in the mortgage will be greater. The system then gathers information from the user so that it may display graphically how much the customer might actually gain by investing their intended down payment. The system asks for the rate of return the customer expects 435. It is contemplated that the system would also display various indices average return for the customer to select, if needed. The system also asks for the customers tax rate 440. It is contemplated that the system could include a tax rate estimator, including the formulas used by the Internal Revenue Service. By the customer inputting his/her income and deduction figures and married status, the tax rate may be calculated. The system then displays a graph 445 of the effects of investing the down payment for the period determined in block 420 or 425. Referring now to FIG. 7, an example is shown in which the customer's gain by investing the money would exceed the additional interest that would be paid. In other words, it would be wiser for the customer to invest the money rather than put it in a down payment. Blocks 430–445 are represented by block 320 in FIG. 3. As an aside, as seen in FIGS. 7–10, a tool bar 710 is shown in the upper right hand corner for the FCs or customer's use. The button with the gavel is intended to allow the FC or the customer to access any legal disclosures required with respect to the products offered. Depending on the applicable regulations, the button may flash when such disclosure is required, allowing the FC or customer to view the disclosure and potentially preventing further activity in the system until the FC or customer acknowledges reviewing the disclosure.

Returning to FIG. 4, the system then gathers information about the customer to determine if the customer is eligible for a low or no down payment program. At block 450, the system inquires about the customer's liquid assets. If the customer is already a client of the financial institution offering the credit products, which the system will know by asking initially for a client account number, the system will cause the workstation 10 to automatically access the financial institution's server 50 and download (represented by the open arrow into block 450) the value of the customer's accounts from the customer data database 240. In this way, the customer's task in completing the overall interview process is diminished because there is less information to manually gather and input. It is also contemplated that the system might retrieve financial information about the customer from the customer's personal computer. Further, it is contemplated that the financial information might be retrieved from any central source, such as a credit bureau or the Internal Revenue Service.

The system also inquires about other investments 455, 465, or investments of the customer's parents 460 that may be used as collateral to decrease the down payment needed for the mortgage. If the customer or his/her parents own other property that is not currently for sale, the market value, state and lien information are entered at block 470. Blocks 450–470 are represented by block 330 of FIG. 3.

The next step in the interview/selection process is to determine the customer's personal opinion of the economic outlook, since this alone may seriously impact the recommendations made by the system for that customer. The economic outlook has two major components—interest rates or stability of monthly payments.

Figure 8:
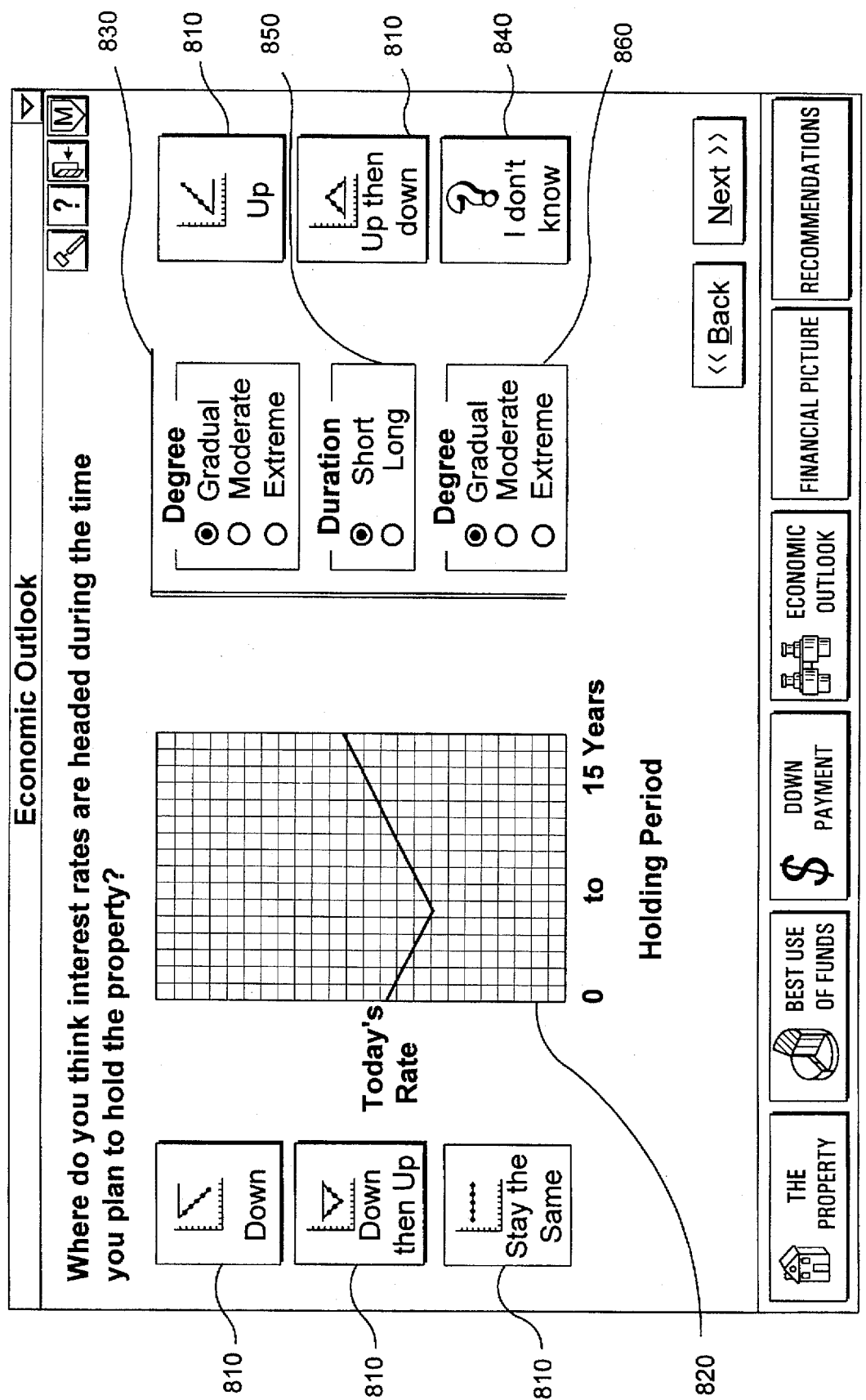
FIG. 8 is an Economic Outlook screen of the system of the present invention.

Referring now the FIG. 8, the customer is presented with five choices, represented by five buttons 810, as to what he/she thinks will be the future of interest rates (block 475, FIG. 4). A graph 820 on the screen shows in a simplified manner what the customer has currently selected. When a button is pressed, that direction for interest rates is shown in the graph 820. For example, in the example screen shown in FIG. 8, the customer has chosen that the interest rates will go down and then up. It is contemplated that the system will include recent news items discussing the future of interest rates to assist the customer. If the customer does not have a sense for the direction of future interest rates or simply chooses not to decide, he/she may select the "I don't know" button 840, which will allow him/her to instead decide how important it is to predict monthly payments (block 485, FIG. 4), described below.

The customer must also select the degree of rise and fall that the interest rates will move. The three choices 830 are gradually, moderately or extremely. Selecting one of the choices 830 causes the down portion of the graph 810 to change, reflecting the degree of movement—the example shows "gradual" degree. By selecting the duration 850 as short, the customer has indicated that the first down portion of the outlook will be short. The system translates a "short" duration into the first ⅓ of the holding period. A "long" duration would be ⅔ of the holding period. In the example of FIG. 8, the customer has also selected that the interest rates will then rise also in a "gradual" degree (at 860). In the final calculations, when the system will be determining which product provides, for example, the lowest monthly payments, the system will move any variable rates according to the customer's selections. For example, if the customer had selected that rates would go up, by also selecting "gradual," the system will move the interest rate by ½ point per year until the lifetime cap is reached. Selecting "moderate" will cause the system to move the rate by 1 point each year, while "extreme" will cause the system to move 2 points each year, both until the lifetime cap is reached.

At block 485, if the customer does not want to address the future of interest rates, the system inquires how important it is to the customer to be able to predict monthly payments. This is preferably measured on a scale of 1 to 10, with 10 being the most important. With selections from 8 to 10, the system will only select products that offer fixed rates over the holding period. With selections from 1 to 3, the system will select products that offer variable and quick changing interest rates over the holding period so that the customer can take advantage of the possibility of lowering the average monthly payment. With selections from 4 to 7, the system will still select products with variable interest rates over the holding period, but only those preselected to have relatively small risks and thus, smaller movements in rate. Blocks 475–485 are represented by block 340 of FIG. 3.

The final step before the system makes its calculations and recommendations is to gather information concerning the customer's income and their cash needs (such as for improvements upon purchasing the house). A short list of categories is displayed for the customer to fill in, such as monthly income monthly debt payments, primary residence payments and number of family members (block 490). If such information is not immediately known to the customer, he/she may press a "Detail Worksheet" button to bring up worksheets with income or expenses broken down into specific categories, which once entered by the customer will be used by the system to calculate the overall income and expenses. The customer's cash need, if any, is also requested (at block 495).

After the five interviewing steps, the system now calculates preferably up to three recommended products for the customer, mainly based on the lowest average interest rate (if the customer should invest the down payment in the mortgage) or the lowest average payment (if the customer should invest the down payment in the market) of the mortgage over the holding period. By this point in the process, the system will have retrieved updated interest rates for the various stored products. The processor uses the financial institution's standard product eligibility formulas (or any other desired formulas) to determine and retrieve from the internal products information database 270 products for which the customer is eligible. Using the property's state, the processor also retrieves any applicable rules and regulations from the internal database 280, such as yearly or lifetime caps for a product. At this point, the system would access the financial institution's server 50 to download the most up-to-date interest rates for the programmed products. Then, using the mortgage amount, holding period, economic outlook information as described above, down payment information, and other parameters, the system performs hypothetical calculations with each product to determine the products with the least average payment or average interest rate over the holding period. Using the economic outlook information described above, the system calculates the interest rate for each year in the holding period and then calculates the average interest rate. Using that calculated rate and standard amortization formulas (for amortizing products), the system then calculates the average payment.

Referring now to FIG. 9, a Recommendations screen is shown in which three products have been recommended by the system based on the customer's information. These three recommendations are shown as buttons 910 that allow the customer to press a recommendation to learn more about the particular product by displaying a product summary retrieved from the interactive interface information 260. Such a product information screen is shown as FIG. 10. One button 1010 allows the customer to see more information about the product. A subwindow 1020 displays the reasons for the recommendations, generated by the system based on the customer's preferences, resources and needs. The calculators button 1030 allows the user to initiate the Calculators submodule, described more fully below, that provides more detailed financial information on the various available products and allows the user to change parameters and view the effects. The application button 1040 initiates the mortgage/credit application generator, described more fully below. Button 1050 causes the processor to retrieve from the interactive interface information 260 and display a brief vignette about how the product selected helped another customer minimize their liability.

Mortgage/Credit Application Generator

Figure 12:
FIG. 12 is a Mortgage Application screen of the system of the present invention.

From either the initial introductory screens, the recommendations screen or any screen with the Application button, the customer may cause the processor to output data to the mortgage/credit application generator submodule 220. The generator 220 then initiates the Application Builder screen, shown as FIG. 11. As seen at areas 1110, the application builder presents an easy-to-use graphic interface (as with all of the submodules of the system) that allows the customer to select his/her particular application needs from the four main sections—Purpose, Income, Assets and Obligations. As each item is selected, it moves to the application list (area 1120) so that the customer can track his/her progress. In the example shown in FIG. 11, John selected that his income comes from salary, he is a client of the financial institution and that he currently carries credit cards accounts. He has yet to select a Purpose—this is done in the example for illustrative purposes, as once a purpose is selected most of the remaining choices are no longer possible and are not displayed. After he (or an FC) has selected all of the appropriate options, selecting "Next >>" will cause the system to create an on-screen electronic form containing all of the necessary fields for a credit application for the selected product. An example of the preferred on-screen form is shown in FIG. 12.

The application is divided into major sections 1210— About the customer, Assets and Liability, Property and Mortgage, and Other Required Info. Each major section 1210 includes subsections 1220 for easier organization. In the example shown, the subsections 1220 for major section "About John" are shown. Any fields 1230 that contain information inputted in any other portion of the interview/ selection process are automatically completed by the application generator, such as the customer name shown in FIG. 12. For example, if the application is for a home purchase mortgage, the description of the property entered at the beginning of the interview process (block 310 & 410) is automatically entered on the form. The customer may change any entries that are automatically entered, if desired. These automatic entries significantly decrease the overall task of completing the application, and, just as important, eliminates repetitive entries by the customer of the same information inputted during the interview process. Further, from the application builder of FIG. 11, the form only contains those sections that are necessary for the options selected, also decreasing the time needed to complete the application.

Figure 13:
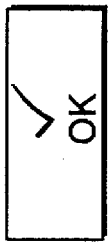
FIG. 13 is a Checklist Builder screen of the system of the present invention.

During the application completion process, the customer may also press the "Checklist Builder" button 1240, which will scan all of the entered information, the product requirements and the state rules and regulations and then generate a checklist of support paperwork and any other forms that must be completed and submitted for the application to be processed, as seen in FIG. 13. For example, for any piece of property that is entered as possible collateral for a no-down-payment mortgage, the generator will create an entry on the checklist listing copies of the deed and lien papers for that property.

The generator 220 is also capable of determining how many of the fields have been completed and will generate a message that the "Application is already_percent complete" whenever the customer switches from the application to another submodule. The processor stores any information entered on the form so that the next time the customer initiates the mortgage/credit application generator, they do not need to start from scratch. Once the electronic form on the screen is completed, the customer may cause the mortgage/credit application generator to print a hardcopy of the application, which then only needs the customer's signature and mailing to the financial institution. It is also contemplated that the customer might submit the completed application electronically. In that case, the processor 200 would cause the workstation 10 to connect to the financial institution's server 50. The application would then be submitted through digital data transfer. Any supporting documents would need to be sent in hardcopy, although scanned images sent electronically are also contemplated.

Refinance Submodule

Referring now to FIG. 5, a high-level logic flowchart for the Refinance Submodule is shown. This submodule is accessed from the initial main menu screen. As the Home Purchase and Refinance submodules both involve credit based on a specific piece of property, their operation has many similarities, as will be seen below.

Initially, the system requests information concerning the property to be refinanced at block 520 (similar to blocks 405, 410). The system then inquires about the current mortgage (block 530), which is not a concern in the Home Purchase submodule. The questions include the remaining balance on the mortgage and the months/years remaining. Then, depending on whether the current mortgage is fixed, adjustable or fixed to float, the system inquires about the starting interest rate, the yearly rate cap and the lifetime cap. If any caps are not known, the system preferably assumes a yearly cap of 2 percent and a lifetime cap of 6 percent.

The system inquires concerning the number of years the customer expects to hold on to the property 540. Similar to blocks 430–445, the system describes how the customer might save through refinancing and then asks similar questions to the Home Purchase submodule. Additionally, the system inquires (at block 550) if the customer intends to invest any savings received. If so, the savings are compounded and added to the benefits calculations.

Both the Economic Outlook and Financial Picture processes (blocks 555, 560) are identical to those regarding the Home Purchase submodule (blocks 475–495). The Recommendation process 565 is also similar to that described above, except the choices are selected based on the lowest average payment over the holding period and the eligibility for refinance.

To determine the actual recommendations, the system starts with the closing costs and origination fees for each recommended product. Using the inputted rate of return (from block 550), the system calculates the result of investing the closing cost and origination fees over the holding period. That value is stored as Refi1. Next, the system determines the difference in average payment over the holding period and multiplies it by the number of months in the holding period. This savings value is stored as Refi2. If the customer indicated that they will invest the savings monthly, the system treats the savings as an annuity with the savings as the contribution. The compounded contribution using the inputted rate of return gives a value stored as Refi3. If the customer intends to invest the savings and Refi1>Refi3, the system recommends that the customer not refinance at all, but take the refinance costs and invest it. If Refi3>Refi1, the system recommends refinancing into that product. If the customer does not intend to invest the savings and Refi1>Refi2, the system recommends against refinancing. If Refi2>Refi1, the system recommends refinancing into that product.

The Recommendations screen is similar to FIG. 10 for the Refinance submodule, and similarly provides access to the mortgage/credit application generator (at 570). The customer completes the application as described above, and submits it either in hardcopy or electronically.

Personal Credit

Referring now to FIG. 6, a functional flowchart for another submodule of the system using the techniques of Liability Management$^{SM}$ is shown. In this submodule, the system will assist the customer in determining whether his/her current credit products are resulting in the lowest costs, i.e., lowest average payment over their respective holding periods. If not, the system can select credit products of the financial institution and recommend them to the customer for lowering his/her overall personal credit costs.

First, it is necessary for the system to analyze the customer's present personal credit portfolio and thus, that information must be entered (block 600). If the customer has some or all of his/her portfolio with the financial institution, the system will automatically retrieve that information. Information on any other credit products, such as credit cards, credit lines and personal loans are manually entered by the customer or FC, including the remaining balance and monthly payments. Based on the information entered, the system then calculates the average interest rate on his/her debt portfolio (block 610).

To determine if any of the financial institution's products would lower the customer's cost, it is first necessary to gather some information about other aspects of the customer's financial situation. This includes any current cash need the customer may have (block 620), as well as any unused credit lines the customer may have, including the available balance and the interest rate that would apply (block 630). Next, the system requests information on any properties that might qualify as collateral to perhaps support more attractive credit products for the customer, rather than a basic, unsecured credit line (block 640). As indicated by the arrow entering block 640, the system will automatically retrieve any information on properties already stored by the financial institution. Of course, if such information had been entered at another part of the system, it would automatically be transferred to this part as well, eliminating the need for redundant entries by the customer or FC. Similar to the properties query, the system also inquires as to any non-retirement investments that might be used by the customer for collateral (block 650). The arrow again indicates that such information might be automatically retrieved from the financial institution or another portion of the system.

Once all the necessary information has been input, the system will make its recommendations. This will be done in a similar manner to the Home Purchase submodule, although additional personal credit products will be considered. The system will first select only those products for which the customer is qualified, based on his/her available collateral, credit needs, outstanding credit, residence state or any other criteria. Then, at some point before calculating the best available product, the system will retrieve updated interest rate information for the products from the financial institution. Once retrieved, the system can perform its lowest monthly cost analysis for the available products.

The products with the lowest average payment over the holding periods will be displayed as recommendations on a Recommendations screen (block 660), similar to FIG. 10 for the Home Purchase submodule, and similarly provides access to the mortgage/credit application generator (at 670). The customer completes the application as described above, and preferably submits it either in hardcopy or electronically.

Calculators Submodule

To assist the customer or FC in making selections, he/she may access the Calculators submodule from any other point in the system. This submodule provides the customer or FC with the ability to perform "what if" calculations for any of the available credit products. Referring now to FIG. 14, a Calculators screen is shown. One of the windows (area 1410, partially covered in FIG. 14) of the screen allows the customer to enter various parameters for a credit product to see the effect, for example, on the monthly payment. By entering the loan amount, interest rate, and term, but leaving the monthly payment box open, the system will automatically calculate the information in the open box. To assist in selecting the various products, they are categorized. By first selecting a major category in area 1420, the system then displays the subcategories in area 1430. Once a subcategory is selected, the system scans its product database to find all of the products within that subcategory and displays them (at area 1440) for selection by the customer. The system will limit the displayed products to those for which the customer is qualified based on set parameters, such as the property state (if the information is already entered in another submodule), but not on the customer's personal finances. If such information has not been entered, the system will inquire regarding the necessary parameters. The parameters of the selected product will then be used in the window (area 1410) for calculations.

The Calculators submodule also allows the FC or customer to view amortization schedules for various products, based on the financial information input in other submodules or in the Calculators submodule. The system also allows the FC or customer to adjust individual payments within the schedule to review the resulting effect on payments after the altered payment. The Calculator submodule also allows the FC or customer to enter information related to either a buy up or buy down of the interest rate and view the resulting payment schedule.

Thus, the system of the present invention provides a simple, interactive process for allowing a customer to select an appropriate credit product based on their own circumstances and opinions. The system also makes the application process itself more simplified, streamlined and less paper intensive for both the customer and the financial institution.

While the embodiments shown and described above are fully capable of achieving the objects and advantages of the present invention, it is to be understood that the embodiments are shown solely for the purpose of illustration and not for the purpose of limitation, the invention being limited solely by the claims.

We claim:

1. An interactive computer system for assisting a user in selecting a liability product from a pre-determined set of liability products, at least a subset of said products having differing variable rate structures, comprising:

means for said user to select a first prediction for the direction of future interest rates;

means for said user to select a second prediction for the rate of change of future interest rates;

means for said user to input the duration that said selected product will be held; and means for calculating the variable rate applicable to each of said liability products over said duration based on said first and second predictions to thereby select at least one of said liability products having one of the lowest average payment and the lowest average interest rate.

2. The system of claim 1, wherein said second prediction may be selected from a first, second and third rate of change, said first rate representing ½ point per year, said second rate representing 1 point per year, said third rate representing 2 points per year, said means for calculating adding the selected rate of change to the variable rate for each of said liability products for each year of said duration.

3. The system of claim 1, further comprising:

means for retrieving updated variable rate structure information for said liability products.

4. The system of claim 3, wherein said means for calculating applies said first prediction for a first portion of said duration, and further comprising:

means for said user to select a third prediction for the direction of future interest rates during a second portion of said duration, said means for calculating applying said third prediction for said second duration portion.

5. The system of claim 4, further comprising:

means for said user to choose one of said liability products selected by said means for calculating; and means for generating a liability/credit application for the chosen liability product, said liability/credit application being automatically partially completed with information regarding said chosen liability product.

6. The system of claim 5, further comprising:

a checklist builder, said builder having a database of possible attachments to said liability/credit application, said checklist builder automatically generating a list of only those attachments necessary based on the chosen liability product.

7. The system of claim 6, further comprising:

means for interactively gathering financial information from said user, said means for generating automatically completing said application with said gathered financial information, said checklist builder automatically altering said list based on said gathered financial information.

* * * * *